United States Patent
Tristant

(10) Patent No.: US 11,124,315 B2
(45) Date of Patent: Sep. 21, 2021

(54) LIGHTNING PROTECTION SYSTEM AND ASSOCIATED NOSE

(71) Applicant: DASSAULT AVIATION, Paris (FR)

(72) Inventor: Fabrice Tristant, Boulogne-Billancourt (FR)

(73) Assignee: DASSAULT AVIATION, Paris (FR)

(*) Notice: Subject to any disclaimer, the term of this patent is extended or adjusted under 35 U.S.C. 154(b) by 349 days.

(21) Appl. No.: 16/009,798

(22) Filed: Jun. 15, 2018

(65) Prior Publication Data
US 2018/0362182 A1 Dec. 20, 2018

(30) Foreign Application Priority Data
Jun. 16, 2017 (FR) .................................... 17 00652

(51) Int. Cl.
*B64D 45/02* (2006.01)
*B64C 1/36* (2006.01)
*H01Q 1/28* (2006.01)
*H02G 13/00* (2006.01)

(52) U.S. Cl.
CPC ............... *B64D 45/02* (2013.01); *B64C 1/36* (2013.01); *H01Q 1/281* (2013.01); *H01Q 1/286* (2013.01); *H02G 13/80* (2013.01)

(58) Field of Classification Search
CPC .......... B64D 45/02; H02G 13/80; B64C 1/36; H01Q 1/286; H01Q 1/281; F21V 15/01; F21V 29/15
USPC ....................................................... 361/218
See application file for complete search history.

(56) References Cited

U.S. PATENT DOCUMENTS

| | | | | |
|---|---|---|---|---|
| 3,416,027 A * | 12/1968 | Amason | ............... | H01Q 1/42 315/36 |
| 4,237,514 A * | 12/1980 | Cline | ............... | B64D 45/02 361/117 |
| 8,462,481 B2 * | 6/2013 | Lambert | ............... | B64D 45/02 361/218 |
| 9,090,355 B2 * | 7/2015 | Yamaguchi | ............... | B64C 3/34 |
| 2005/0041362 A1 * | 2/2005 | Hall | ............... | B64D 45/02 361/225 |
| 2008/0137259 A1 * | 6/2008 | Heeter | ............... | B64D 37/32 361/218 |

(Continued)

FOREIGN PATENT DOCUMENTS

EP 2415693 A1 2/2012

OTHER PUBLICATIONS

Search report of French priority application FR 1700652.

*Primary Examiner* — Thienvu V Tran
*Assistant Examiner* — Shahzeb K Ahmad
(74) *Attorney, Agent, or Firm* — Davidson, Davidson & Kappel, LLC

(57) ABSTRACT

A lightning protection system of an aircraft includes a wall defining an inner surface and an outer surface. The outer surface is configured to come into contact with a mass of air located around the aircraft. The lighting protection system also includes at least two electrically conductive lighting traps received in holes traversing the wall and at least one strip with pellets having an electrically insulating substrate and electrically conductive pellets spaced apart from one another on the electrically insulating substrate. The strip with pellets is fastened on the wall by the two lightning traps. The strip with pellets is attached on the inner surface of the wall.

21 Claims, 10 Drawing Sheets

(56) References Cited

U.S. PATENT DOCUMENTS

| | | | | |
|---|---|---|---|---|
| 2009/0159306 A1* | 6/2009 | Loche | ............... | H02G 13/00 |
| | | | | 174/2 |
| 2010/0320315 A1* | 12/2010 | Kashiwagi | ............ | F16B 33/004 |
| | | | | 244/1 A |
| 2014/0373359 A1* | 12/2014 | Schomaker | ............ | B64D 45/02 |
| | | | | 29/897.2 |
| 2017/0303376 A1* | 10/2017 | Kaste | ............... | F16B 33/006 |

* cited by examiner

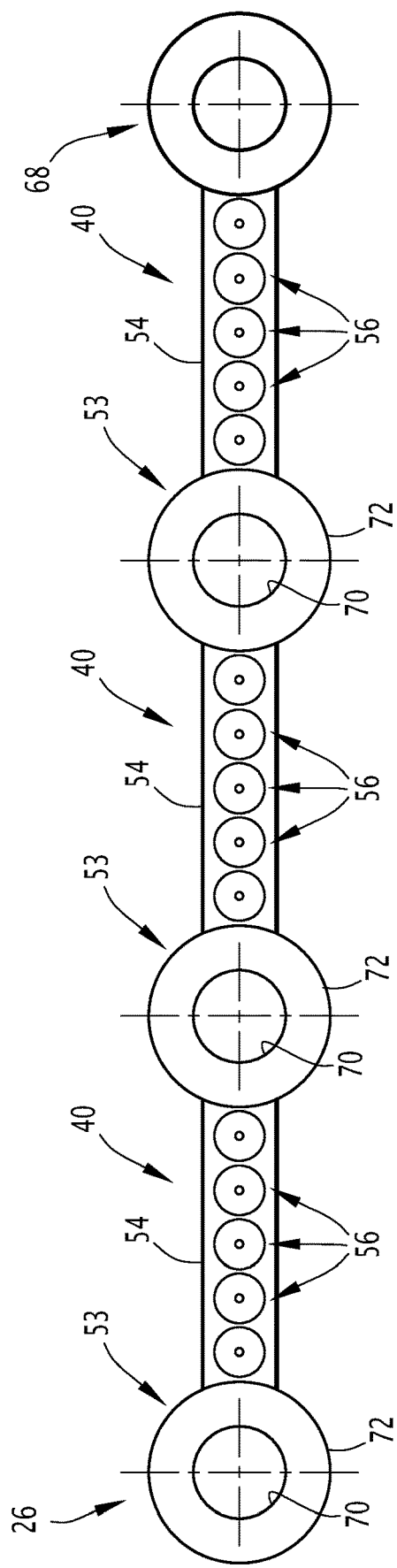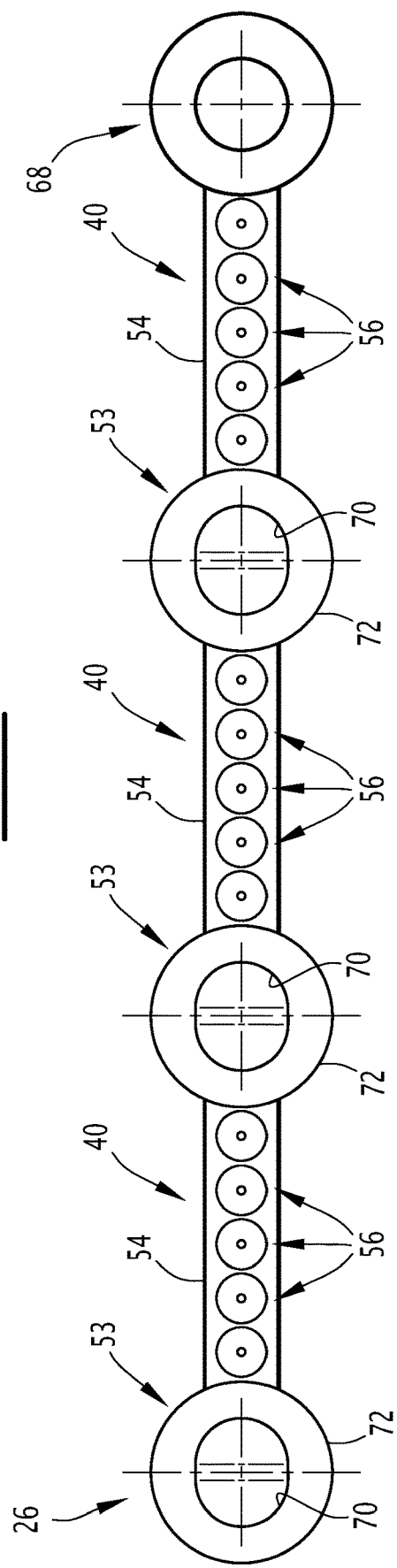

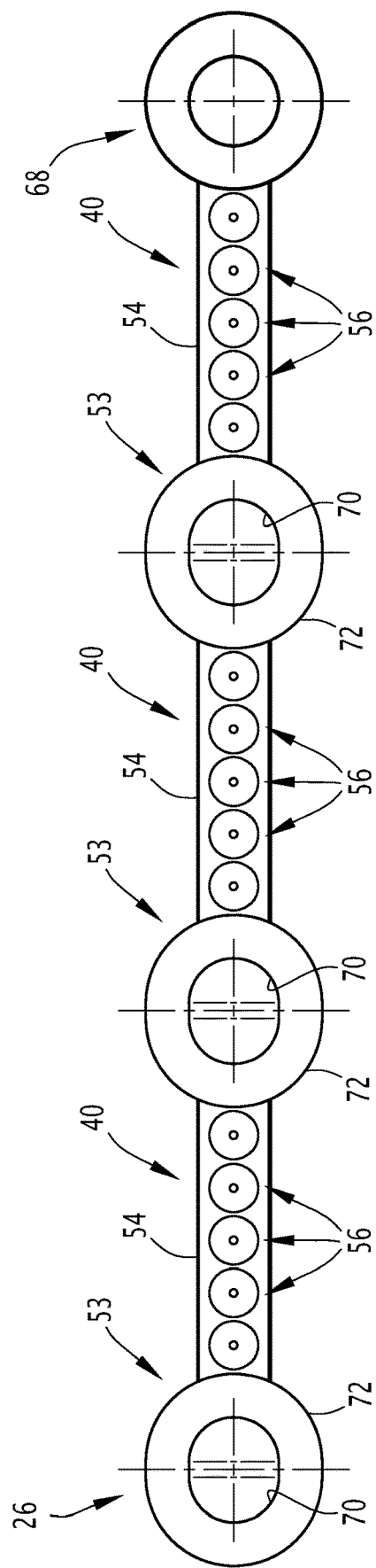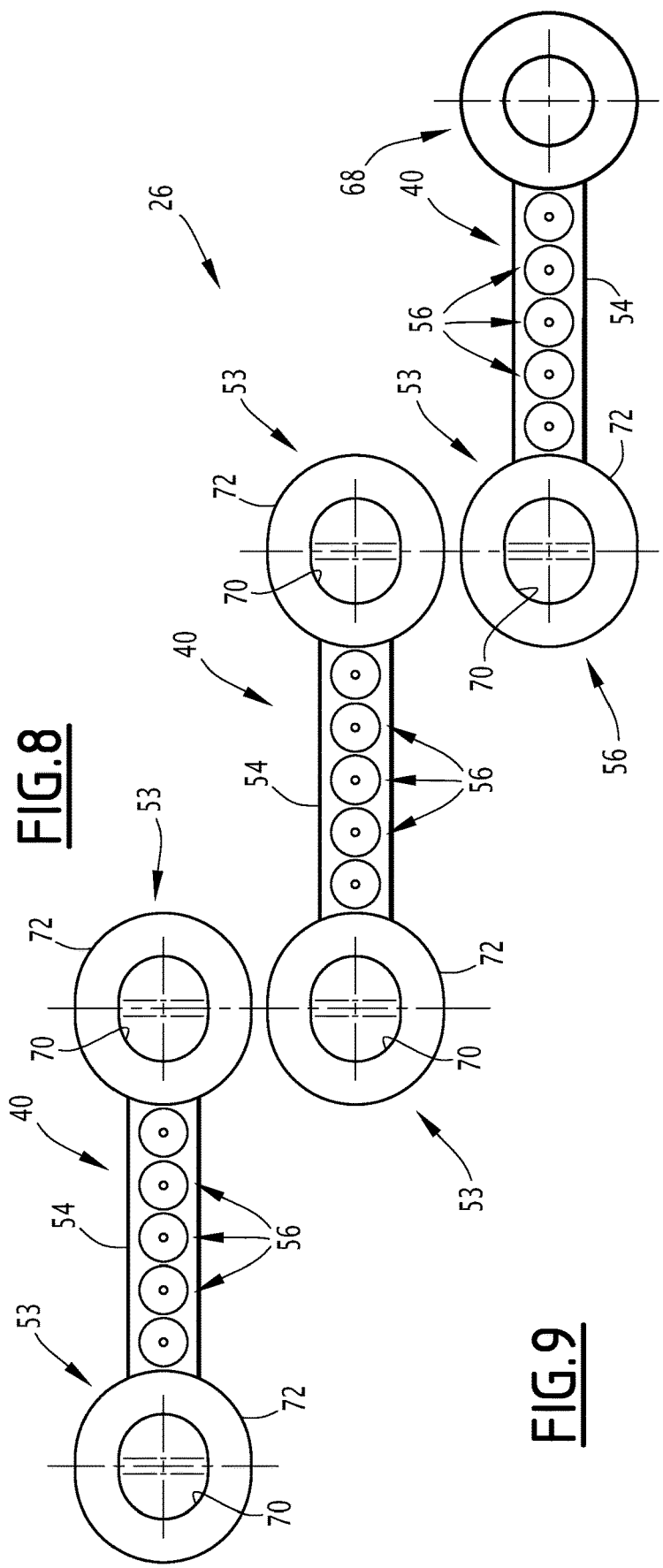
FIG.8
FIG.9

LIGHTNING PROTECTION SYSTEM AND ASSOCIATED NOSE

The present invention relates to a lightning protection system of an aircraft comprising a wall, defining an inner surface and an outer surface, the outer surface being intended to come into contact with a mass of air located around the aircraft; at least two lightning traps, received in holes traversing the wall, the lightning traps being electrically conductive, and at least one strip of pellets spaced apart from one another on the electrically insulating substrate, the strip of pellets being fastened on the wall by the two lightning traps.

Such a lightning protection system is in particular used in the protection of an aircraft nose housing an antenna for emitting or receiving an electromagnetic signal. The antenna and the nose itself are in fact elements sensitive to lightning strikes, which may damage or destroy them. The lightning protection system is able to channel the electrical current generated by the lightning.

BACKGROUND

Among the known lightning protection systems, document FR 2,924,686 describes a system comprising a metal conductive bar, mounted on the outer wall of the nose. The electrical current generated by the lightning flows along the bar.

SUMMARY OF THE INVENTION

However, such a system is not fully satisfactory. Indeed, the metal bar damages the electromagnetic transparency around the antenna. The lightning protection system then is not transparent to the electromagnetic waves emitted or received by the antenna.

Furthermore, the nose being arranged at the front of the aircraft and having an aerodynamic profile, the known lightning protection systems disrupt the flow of air around the nose and increase the aerodynamic drag. The lightning protection system then increases the fuel consumption of the aircraft.

One aim of the invention is therefore to provide a lightning protection system for an aircraft reducing the aerodynamic drag, improving the aesthetics, while guaranteeing good transparency to the electromagnetic waves.

To that end, a lightning protection system for an aircraft of the aforementioned type is provided, characterized in that the strip with pellets is attached on the inner surface of the wall.

According to specific embodiments, the system includes one or more of the following features:
- the substrate of the strip with pellets is a strip having a width smaller than 20 mm, in particular comprised between 15 mm and 20 mm;
- the pellets are spaced apart from one another by an air gap smaller than 0.1 mm;
- the substrate has a thickness comprised between 0.1 mm and 0.5 mm;
- the lightning traps have a frustoconical upper part flaring toward the outer surface, a section of the upper part at the outer surface being comprised between 100 mm$^2$ and 300 mm$^2$;
- the system comprises a cover covering the lightning traps and the strip with pellets, the cover being electrically insulating;
- the cover has a thickness comprised between 1 mm and 5 mm;
- the cover, the strip with pellets and the inner surface delimit an inner space filled with an electrically insulating fluid, in particular filled with air;
- the cover is fastened by its lateral edges to the lateral edges of the strip with pellets, and is arranged separated from the strip with pellets, the lightning traps and the pellets;
- the strip with pellets is fastened by at least one additional lightning trap, the lightning traps being separated by a distance greater than 100 mm, advantageously comprised between 100 mm and 300 mm;
- the system includes at least one washer part and/or washer arranged at the end of a strip with pellets, a lightning trap being mounted in the washer part or in the washer;
- the system comprises at least one row of pellets comprising a plurality of strips with pellets and washers, each washer of said row being inserted between two successive strips with pellets, and being secured to strips with pellets between which it is interposed, at least one of said washers having a through passage receiving a lightning trap,
- said through passage has an oblong inner contour;
- said washer has a noncircular outer contour, for example oblong;
- the system comprises at least one row of pellets comprising a plurality of strips with pellets, each strip with pellets of the row being secured to two washers respectively arranged at each end of the strip with pellets, each washer of one end of a strip with pellets being superimposed on a washer of one end of an adjacent strip with pellets;
- the system comprises at least one row of pellets comprising a plurality of strips with pellets, each strip with pellets of the row being secured to two washer parts respectively arranged at each end of the strip with pellets, each washer part being formed by two parallel straight branches connected by a curved branch;
- the system comprises at least one row of pellets, the row comprising a plurality of strips with pellets, each strip with pellets of said row being substantially straight while extending respectively along a longitudinal axis, the longitudinal axes of at least two successive strips with pellets of said row forming an angle between them greater than 5°; and
- the system comprises at least one row of pellets, the row being divided, from a root, into a plurality of auxiliary branches of strips with pellets.

An aircraft part is also provided comprising an antenna configured to emit and/or receive an electromagnetic signal, and a lightning protection system as defined above, the wall of the lightning protection system surrounding the antenna.

According to specific embodiments, the aircraft part includes one or more of the following features:
- the lightning protection system comprises an electrically conductive metal foil fastened on the inner surface of the wall, and an intermediate lightning trap fastening both said conductive metal foil and a strip with pellets on the inner surface of the wall, the conductive metal foil being located behind the antenna;
- the aircraft part defines an inner volume, the antenna delimiting a radiation zone in the inner volume intended to be traversed by an electromagnetic signal received or emitted by the antenna, said intermediate lightning trap being arranged outside the radiation zone; and the antenna has a minimal operating wavelength associated with a maximal operating frequency, each pellet having a maximal cross-section having a larger dimension smaller than the minimal operating wavelength, in particular smaller than one fifth of the minimal operating wavelength, preferably smaller than one tenth of the minimal operating wavelength; and/or each lightning trap having a maximal cross-section having a larger dimension smaller than the minimal operating wavelength.

A method for mounting a lightning protection system is also provided, comprising the following steps:

providing a wall defining an inner surface and an outer surface, the outer surface being intended to come into contact with a mass of air located around the aircraft;

mounting at least two lightning traps, received in holes traversing the wall, the lightning traps being electrically conductive, and fastening by the two lightening traps of at least one strip of pellets spaced apart from one another on the substrate, the strip with pellets being fastened on the inner surface of the wall.

The mounting method may comprise one or more of the following features, considered alone or according to any technically possible combination:

arranging at least one washer part and/or at least one washer at the end of a strip with pellets, a lightning trap being mounted in the at least one washer part or in the at least one washer;

the method comprises providing a row of pellets comprising a plurality of strips with pellets and washers, each washer of said row initially being inserted between two successive strips with pellets, and secured to strips with pellets between which it is interposed, at least one of said washers having a through passage intended to receive a lightning trap, said through passage having an oblong inner contour, the method including inserting the lightning trap into one of the through holes of the wall and into the through passage of said washer; and fastening the lightning trap to the wall and the row.

the method includes providing several strips with pellets, initially arranged separated from one another, each strip with pellets initially being secured to two washers respectively arranged at each end of the strip with pellets, each washer having a through passage intended to receive a lightning trap, said through passage having an oblong inner contour, the method including fastening strips with pellets against the wall, while superimposing the washers of two successive strips with pellets, to form a row, and inserting the lightning trap in one of the through holes of the wall and through the through passages of two superimposed washers; and the method includes providing several strips with pellets, initially arranged separated from one another, each strip with pellets initially being secured to two washer parts respectively arranged at each end of the strip with pellets, each washer part being formed by two parallel straight branches connected by a curved branch, the method including fastening strips with pellets against the wall, by superimposing, on at least one region, the washer parts of two successive strips with pellets, to form a row, and inserting the lightning trap in one of the through holes of the wall and through a passage delimited by two superimposed washer parts.

BRIEF SUMMARY OF THE DRAWINGS

The invention will be better understood upon reading the following description, provided as an example, and in reference to the appended drawings, in which:

FIGS. 6 to 8 are schematic views of a row of pellets of the lightning protection system of a third, fourth and fifth nose according to an embodiment of the invention;

FIG. 9 is an exploded schematic view of a row of pellets of a sixth nose according to an embodiment of the invention;

DETAILED DESCRIPTION

Figure 1:
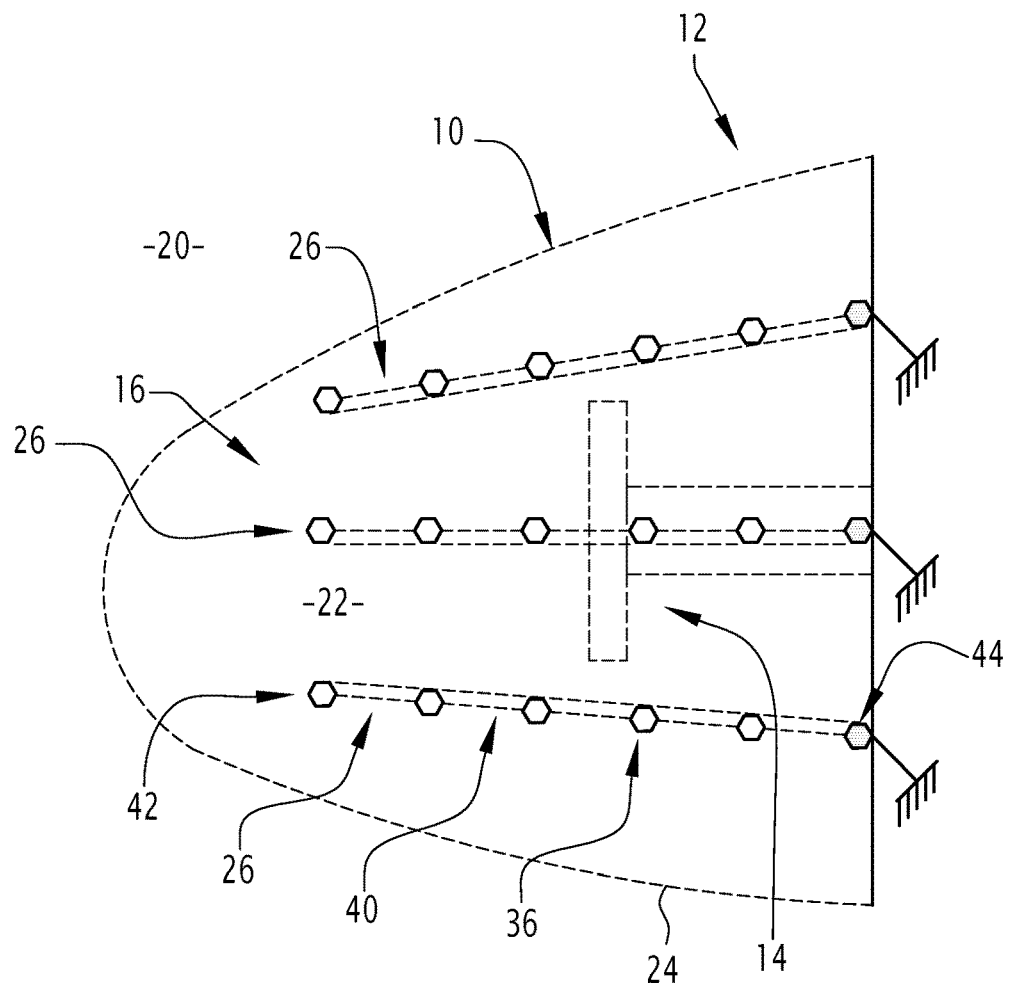
FIG. 1 is a schematic view of a first nose according to an embodiment of the invention.
Figure 2:
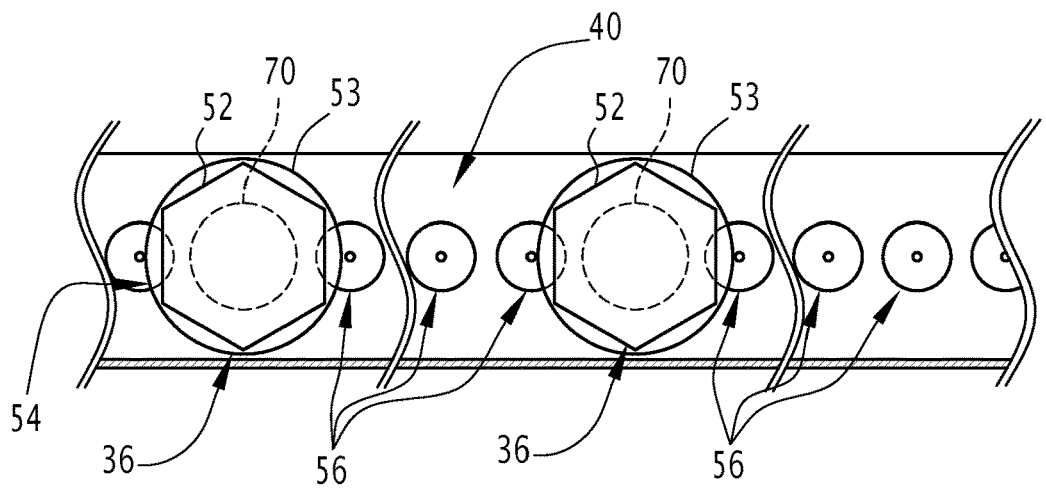
FIG. 2 is a schematic view of a strip with pellets of a lightning protection system of the nose of FIG. 1.
Figure 3:
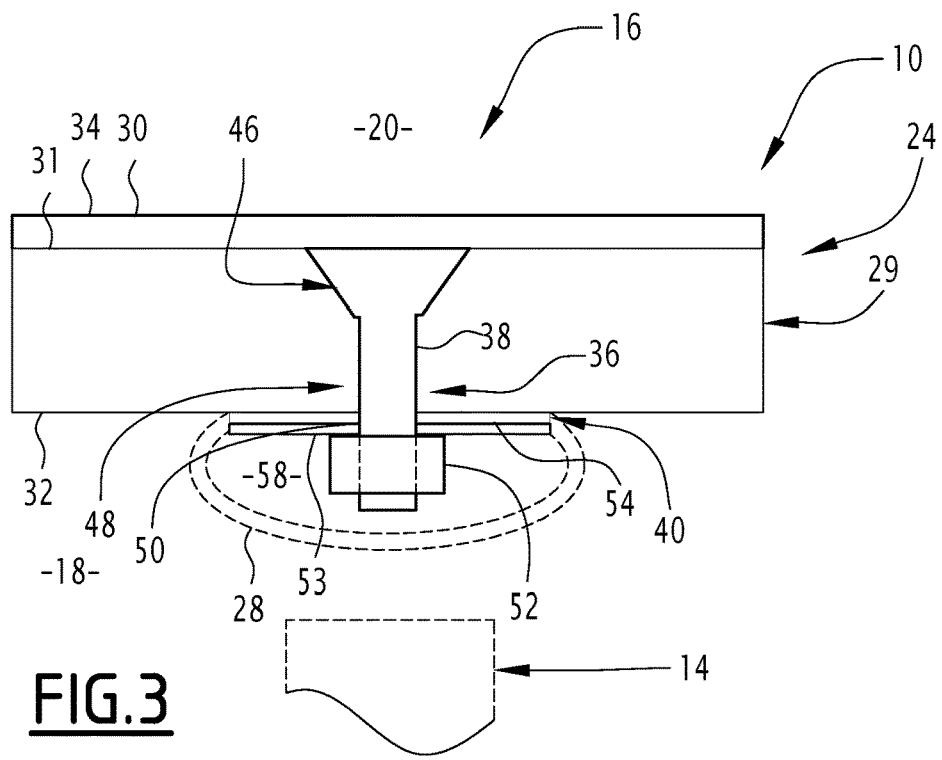
FIG. 3 is a schematic sectional view of a lightning protection system of the nose of FIG. 1.

A first nose 10 of an aircraft 12 according to an embodiment of the invention is illustrated in FIGS. 1 to 3.

The nose 10 comprises at least one antenna 14 and a lightning protection system 16 arranged around the antenna 14. The lightning protection system 16 here is a nose cone covering the antenna 14.

The nose 10 is intended to come into contact with a mass of air 20 surrounding the aircraft 12, such that the mass of air 20 flows over a surface of the nose 10.

The antenna 14 is configured to emit and/or receive an electromagnetic signal.

It is configured in particular to emit and/or receive a signal having a frequency in a first operating range advantageously comprised between 100 MHz and 10 GHz, the operating range having a maximal operating frequency associated with a maximal operating wavelength.

The antenna 14 has an operating wavelength, associated with an operating frequency for emitting a signal in the operating range.

The antenna 14 has a radiating zone 22 that traverses the inner volume 18 of the nose 10, intended to be traversed by an electromagnetic signal emitted by the antenna 14.

The radiating zone 22 is for example determined by the near-field radiating zone.

The radiating zone 22 is located in front of the antenna 14.

The antenna 14 is for example an antenna of a radar, in particular a meteorological radar.

The lightning protection system 16 comprises a wall 24 delimiting an inner volume 18, and at least one row 26 of pellets mounted in the inner volume 18.

In the example illustrated in FIG. 1, the lightning protection system 16 comprises several parallel rows 26 of pellets mounted on each side of the wall 24. The lightning protection system 16 comprises a number of rows 26 of pellets greater than 3, and for example comprised between 5 and 7.

The lightning protection system 16 has no metal bar extending across from the rows 26 of pellets.

The wall has a substantially conical shape with a rounded tip in the front. It surrounds the antenna 14.

The wall 24 for example includes an inner structure 29. The inner structure 29 is for example an antenna comprising two layers respectively arranged on opposite faces of a honeycomb core.

These layers are made from composite. They are for example made from glass composites, silica composites, silicon carbide composites, quartz composites, basalt composites, aramid fibers or any other composite having suitable dielectric properties.

The honeycomb core is for example made from aramid.

The wall 24 has a thickness comprised between 5 mm and 15 mm.

The wall 24 comprises a layer of paint 30 covering an outer surface 31 of the inner structure 29. The layer of paint has a thickness smaller than 500 µm.

The wall 24 defines an inner surface 32 and an outer surface 34.

The outer surface 34 of the wall 24 is intended to come into contact with the mass of air 20 located around the aircraft 12.

Each row 26 of pellets, illustrated in more detail in FIG. 2, comprises at least two lightning traps 36, received in through holes 38 of the wall 24, and at least one strip with pellets 40 fastened or glued to the wall 24 by the two lightning traps 36.

In the example illustrated in FIG. 1, each row 26 comprises a single strip with pellets 40.

Each row 26 comprises at least one lightning trap 36, advantageously several lightning traps 36. In particular, along a row 26 of pellets, two successive lightning traps 36 are separated by a distance greater than 100 mm, advantageously comprised between 100 mm and 300 mm.

The distance separating two successive lightning traps 36 is for example constant for a same row 26.

Each row 26 of pellets in particular comprises a first lightning trap 42 and a last lightning trap 44, each fixing a single strip with pellets 40 of the row 26.

The first lightning trap 42 and the last lightning trap 44 are respectively located in front of and behind the antenna 14.

The last lightning trap 44 is connected to a primary metal structure of the aircraft, for airplane grounding of the row 26, on the primary metal structure of the aircraft.

The lightning traps 36 are intended to attract the lightning and guide an electrical current created by the lightning from the outer surface 34 of the wall 24 toward a strip with pellets 40.

Each lightning trap 36, illustrated in more detail in FIG. 3, is electrically conductive, and flush with the outer surface 31 of the inner structure 29 of the wall 24.

Each lightning trap 36 is metal and for example made from steel or titanium. In an alternative, a resin and/or electrically insulating insert is (are) added in the hole 38. The resin and the insert make it possible to stiffen the wall 24 at the hole 38 of the lightning trap 36.

Each lightning trap 36 is covered by the layer of paint 30 of the wall 24.

Each lightning trap 36 has a maximal cross-section having a larger dimension smaller than the operating wavelength of the antenna, preferably the minimal operating wavelength.

As shown in FIG. 3, each lightning trap 36 has a frusto-conical outer upper part 46, and a cylindrical lower part 48 extending the upper part 46 inward.

Each lightning trap 36 is able to guide an electrical current from its outer part 46 to its lower part 48.

The upper part 46 flares toward the outer surface 34 of the wall 24.

The upper part 46 is covered by the layer of paint 30.

A cross-section of the upper part 46 at the outer surface 34 is comprised between 100 mm$^2$ and 300 mm$^2$.

A cross-section of the lower part 48 is strictly smaller than the cross-section of the upper part 46 at the outer surface 34.

The diameter of the lower part 48 is greater than 5 mm and for example comprised between 5 mm and 10 mm.

The lower part 48 protrudes relative to the inner surface 32 of the wall 24 in the inner volume 18. It traverses an orifice 50 of the strip with pellets 40.

The lower part 48 is for example threaded and cooperates with a nut 52 and with an electrically conductive washer 53 to fasten the strip with pellets 40 on the inner surface 32 of the wall 24. The electrically conductive washer 53 is arranged between the nut 52 and the strip with pellets 40.

Each strip with pellets 40, illustrated in more detail in FIG. 2, is attached on the inner surface 32 of the wall 24.

Each strip with pellets 40 includes an electrically insulating substrate 54 and electrically conductive pellets 56 spaced apart from one another on the electrically insulating substrate 54.

Each strip with pellets 40 has a voltage release threshold, such that, when a voltage applied between a lightning trap 36 and the last lightning trap 44 is above a breakdown voltage, an electric current flows in the strip with pellets 40 from said lightning trap 36 to the last lightning trap 44 and next to the aircraft ground. The breakdown voltage is in particular proportional to the number of air gaps between the pellets 56 between said lightning trap 36 and the last lightning trap 44.

In the example illustrated in FIG. 2, each strip with pellets 40 comprises a predetermined number of pellets 56. This number depends on the size of the pellets 56 and the distance between the lightning traps 36. It is in particular greater than 20, and for example comprised between 20 and 100. In another alternative, each strip with pellets 40 comprises a number of pellets 56 greater than 40.

The substrate 54 of each strip with pellets 40 is fastened on the inner surface 32 of the wall 24 by the lightning traps 36. Additionally, the substrates 36 are glued on the lower surface 32.

As illustrated in FIGS. 2 and 3, the substrate 54 is a strip having a width smaller than 20 mm, in particular comprised between 15 mm and 20 mm.

The substrate 54 has a thickness comprised between 0.1 mm and 0.8 mm, for example comprised between 0.1 mm and 0.5 mm.

The pellets 56 are fastened to the substrate 54. They protrude inward away from the substrate 54.

Each pellet 56 has a maximal cross-section having a larger dimension smaller than the operating wavelength, preferably smaller than the minimal operating wavelength. This larger dimension is for example smaller than one fifth of the operating wavelength, in particular the minimal operating wavelength, preferably smaller than one tenth of the operating wavelength, in particular the minimal operating wavelength.

In the example of FIG. 2, the pellets 56 are circular and have a diameter corresponding to substantially one tenth of the operating wavelength, in particular the minimal operating wavelength, of the antenna 14. In one example, the pellets 56 have a diameter comprised between 1 mm and 10 mm, in particular equal to 3 mm. Alternatively or additionally, the pellets 56 of the strip with pellets 40 have a diameter smaller than 8 mm.

The pellets 56 are spaced apart from one another on the substrate 54 by an air gap smaller than 0.1 mm.

The space separating two successive pellets 56 is filled with an electrically insulating separating fluid such as air.

As illustrated in FIG. 2, for at least one pellet 56, the washer 53 of the nut 52 of a lightning trap 36 successive to said pellet 56 is in contact with said pellet 56. In particular, the washer 53 of the nut 52 partially covers said pellet 56. In the example illustrated in FIG. 2, the washer 53 of the nut 52 is placed in contact with two successive pellets 56.

The washer 53 thus protects the pellets 56, during the tightening of the nut 52 against the strip with pellets 40. It in particular prevents pulling out of the pellets 56 during the tightening of the nut 52.

The pellets 56 are for example made from tungsten or titanium.

The operation of the nose 10 according to the first embodiment will now be described.

When a lightning bolt forms in the mass of air 20 surrounding the aircraft 12, the latter is attracted by at least one of the lightning traps 36 and touches the lightning trap 36.

An electric current is generated in the lightning trap 36 touched by the lightning bolt.

The electric current is guided through the lightning trap 36 from the outer surface 34 of the wall 24 toward the inner surface 32. In particular, the electric current is guided from the frustoconical upper part 46 of the lightning trap 36 toward its lower part 48.

The washer 53 of the nut 52 of the lightning trap 36 being electrically conductive and in contact with a first pellet 56, the current passes from the lightning trap 36 to said first pellet 56.

Subsequently, from this first pellet 56, the electric current passes in the row 26 of pellets by successive ionization of the fluid separating two successive pellets.

The electric current thus flows from the lightning trap 36 touched by the lightning bolt to the last lightning trap 44, and next to the aircraft ground.

Given that the electric current flows in the row 26, the antenna 14 is protected from any damage related to this electric current.

As an alternative to the first embodiment, the lightning protection system 16 further comprises at least one electrically insulating cover 28, covering a row 26 of pellets, illustrated in dotted lines in FIG. 3.

The cover 28 is intended to protect the antenna 14 from an electric current propagating in the row 26 of pellets. In particular, the cover 28 is able to prevent the establishment of a short circuit between the lightning traps 36 or the row 26 of pellets and the antenna 14.

The cover 28 covers the lightning traps 36 and the strip with pellets 40 of the row 26 of pellets.

The cover 28 is attached and fastened on the inner surface 32 of the wall 24. It is fastened by its lateral edges to the lateral edges of the strip with pellets 40. It overlaps the lightning traps 36 and the strip with pellets 40. It is thus arranged separated from the strip with pellets 40, the lightning traps 36 and the pellets 56, delimiting a protected inner space 58 filled with an electrically insulating fluid, in particular filled with air.

The cover 28 has a convex curved cross-section, in particular C-shaped. Alternatively, the cover 28 has any other shape allowing the placement of an insulating barrier preventing the establishment of a short circuit between the antenna 14 and the strip with pellets 40 or the lightning traps 36.

The cover 28 is for example made from polycarbonate.

The cover 28 has a thickness comprised between 1 mm and 5 mm.

In one embodiment, the cover 28 is open-worked, and comprises an opening. The opening of the cover 28 extends away from the antenna 14.

Alternatively or additionally, it includes a transparent region.

Such an opening and such a transparent region facilitate visual inspection during maintenance operations.

During operation, the cover 28 being electrically insulating, it prevents any short circuit between the row 26 of pellets or the traps 36 and the antenna 14, during the flow of the electrical current.

Figure 4:
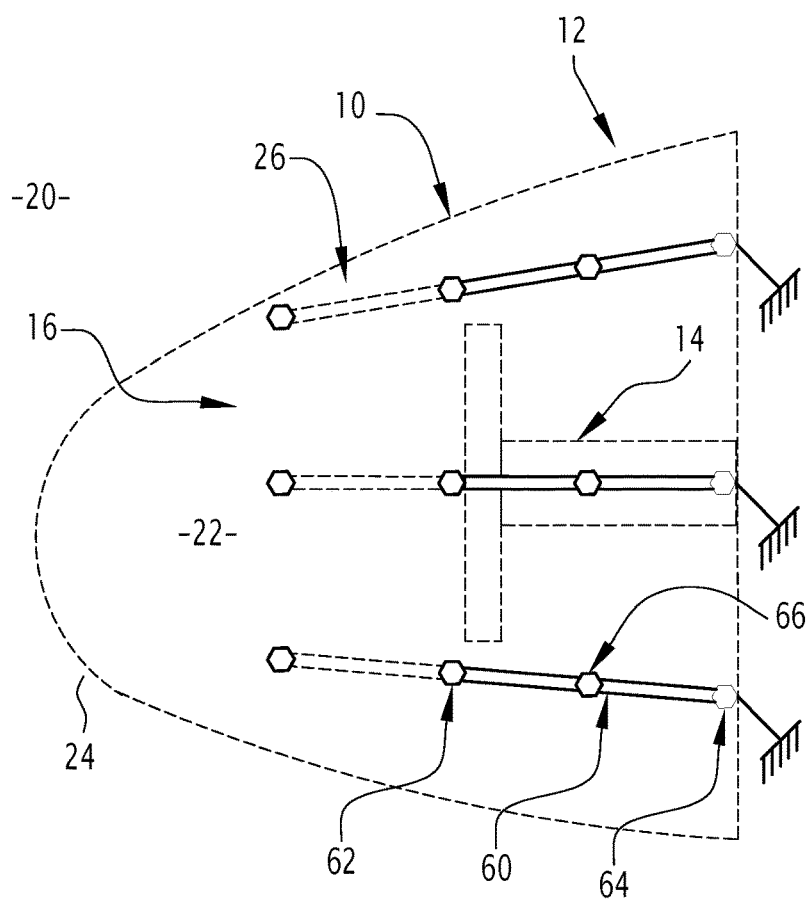
FIG. 4 is a schematic view of a second nose according to an embodiment of the invention.
Figure 5:
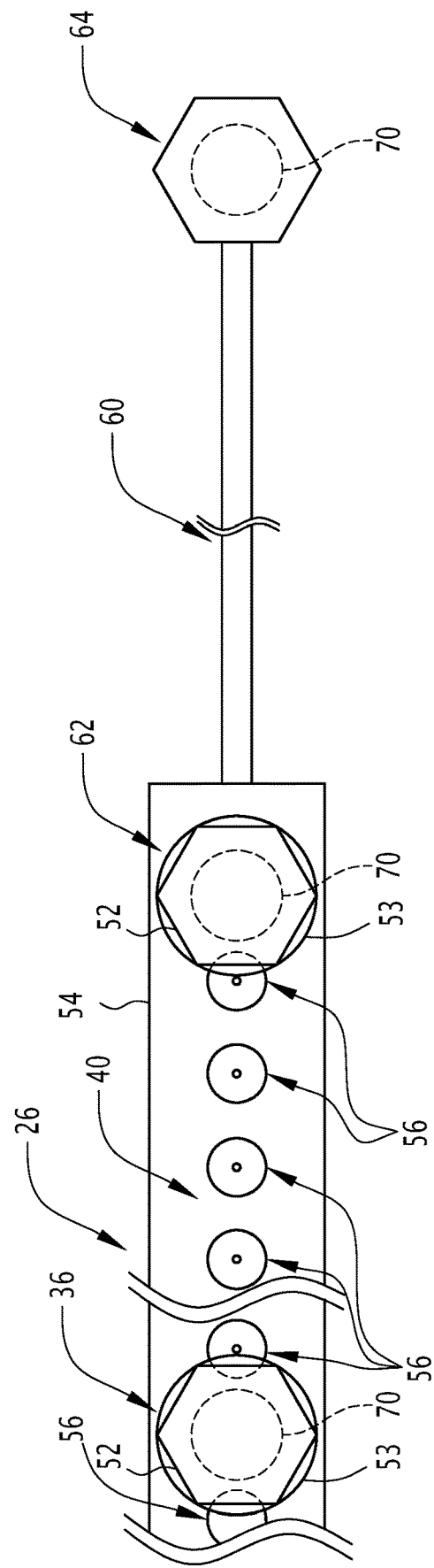
FIG. 5 is a schematic view of a strip with pellets of a lightning protection system of the nose of FIG. 4.

A second nose 10 according to an embodiment of the invention is illustrated in FIGS. 4 and 5.

In this second embodiment, each row 26 of pellets further comprises an electrically conductive metal foil 60, for example fixed on the inner surface 32 of the wall 24 and in contact with this inner surface 32.

The conductive metal foil 60 has a constant square, rectangular or circular cross-section.

Alternatively, the section is not constant over the entire conductive metal foil 60. The section is for example circular between the lightning traps 36 and flat at the lightning traps 36.

The conductive metal foil 60 is fixed on the inner surface 32, at a front end, by an intermediate lightning trap 62 fixing both said conductive metal foil 60 and the strip with pellets 40 of the row 26 of pellets.

The conductive metal foil 60 is fixed on the inner surface 32, at a rear end, by a rear lightning trap 64. The rear lightning trap 64 is connected to a primary metal structure of the aircraft, for airplane grounding formed by the primary metal structure of the aircraft.

The conductive metal foil 60 is, like in the example illustrated in FIG. 4, fixed on the inner surface 32 by one or several other additional lightning trap(s) 66 arranged between the intermediate lightning trap 62 and the rear lightning trap 64.

The conductive metal foil 60 is substantially aligned with the strips with pellets 40 of the row 26.

As illustrated in FIG. 4, the conductive metal foil 60 is located outside the radiating zone 22 of the antenna 14.

The conductive metal foil 60 is for example located behind the antenna 14.

In particular, the intermediate lightning trap 62 is arranged outside the radiating zone 22. In an alternative, the intermediate lightning trap 62 is for example located behind the antenna 14.

Advantageously, the cover 28 of the row 26 of pellets also covers the conductive metal foil 60 of this row 26.

The cover 28 then prevents any risk of short circuit between the row 26 of pellets and the antenna 14.

The operation of the second nose 10 differs from that of the first nose 10 in that once the electric current reaches the intermediate lightning trap 62, beyond the antenna 14, it then flows into the conductive metal foil 60 up to the rear lightning trap 64.

Alternatively, the conductive metal foil 60 is fixed on the inner surface 32 of the wall 24 and offset by a predetermined play relative to this inner surface 32. The predetermined play is for example comprised between 1 mm and 5 mm.

In this alternative, the lightning protection system preferably comprises a dielectric layer of a dielectric material at least arranged between the metal foil 60 and the inner surface 32.

The thickness of the dielectric layer is comprised between 0.5 mm and 2 mm. The predetermined play is thus able to allow the placement of said dielectric layer.

Such a dielectric layer avoids direct reattachment phenomena on the metal foil between the lightning traps 36. Said layer is for example arranged around the metal foil 60 in zones of the metal foil 60 between the lightning traps 36.

As an alternative to the preceding embodiments, each row 26 comprises a plurality of strips with pellets 40 placed end-to-end. The strips with pellets 40 of a same row 26 are substantially aligned. Each row 26 then comprises a number of lightning traps 36 strictly greater than the number of strips with pellets 40. Furthermore, a same lightning trap 36 fixes the ends of two successive strips with pellets 40.

A third nose according to an embodiment of the invention will now be described, in reference to FIG. 6.

This third nose differs from the first nose in that at least one row 26 comprises a plurality of strips with pellets 40 and the washers 53, each washer 53 of said row 26 being inserted between two successive strips with pellets 40, and being secured to strips with pellets 40 between which it is interposed.

For clarity reasons, only the row 26, without the lightning traps 36, is shown in FIG. 6.

"Secured" means that even when the row 26 is arranged separated from the wall 24, each washer 53 is still fixedly carried by the strips with pellets 40 between which it is interposed.

Each washer 53 is in particular secured to the substrates 54 of the strips with pellets 40 between which it is interposed.

In the example illustrated in FIG. 6, the row 26 comprises three strips with pellets 40. Alternatively, the row 26 comprises more or fewer than three strips with pellets 40.

The strips with pellets 40 of the row 26 are substantially aligned.

Furthermore, unlike the first nose, each washer 53 is arranged separated from the pellets 56 of the strip with pellets 40. In particular, no washer 53 covers a pellet 56.

Each washer 53 and a pellet 56 adjacent to the washer 53 are spaced apart by an air gap substantially equal to the air gap separating two successive pellets 56 in the strip with pellets 40.

The space separating the washer 53 and a pellet 56 adjacent to the washer 53 is filled with an electrically insulating separating fluid such as air. During operation, once the electrical current reaches one of the washers 53, the current passes from the washer 53 to the successive pellet 56 by ionization of the separating fluid separating them.

In the example of FIG. 6, each strip with pellets 40 is substantially straight while extending along a longitudinal axis, and each washer 53 has a width, considered perpendicular to the longitudinal axis, greater than the width of the substrate 54.

The washer of the last lightning trap 44 is designated by reference 68 in FIG. 6.

In the example illustrated in FIG. 6, each washer 53, 68 has a circular outer contour. Said outer contour has a diameter greater than 6 mm, for example equal to 9 mm.

The lower part 48 of the lightning trap received in the washer has, for example, in this case a diameter of 6 mm.

Each washer 53, 68 has a through passage 70 receiving a lightning trap 36.

In the example illustrated in FIG. 6, the through passage 70 receiving the lower part 48 of each washer 53, 68 has a circular inner contour.

Said through passage 70 here has a diameter greater than 5 mm, for example equal to 6 mm or 8 mm.

More specifically, each through passage 70 receives the lower part 48 of a lightning trap 36.

The diameter of the inner contour of each through passage 70, considered perpendicular to the longitudinal axis, is greater than or equal to the transverse dimension of the lower part 48 that it receives.

No substrate 54 extends in the through passages 70.

This embodiment is particularly suitable for the case where the drilling allowances are small, for example less than 1 mm.

A fourth nose according to an embodiment of the invention will now be described, in reference to FIG. 7.

This fourth nose differs from the third nose of FIG. 6 in that, aside from the washer 68 of the last lightning trap 44, the through passage 70 of each washer 53 has an oblong inner contour.

The oblong shape here is defined by two half-circles connected to one another by two parallel lines.

The oblong shape of each of said through passages 70 is more elongated along the longitudinal axis than perpendicular to this axis.

More specifically, the length of the oblong shape, considered along the longitudinal axis, of each through passage 70 is greater than the transverse dimension of the lower part 48 that it receives, considered along the longitudinal axis.

The width of the oblong shape, considered perpendicular to the longitudinal axis, is greater than or equal to the transverse dimension of the lower part 48 that it receives, considered perpendicular to the longitudinal axis.

An assembly of the lightning protection system 16 of the fourth nose according to an embodiment of the invention will now be described.

The assembly comprises providing the wall 24 and providing the row 26 that have been described above.

When providing the row 26, each washer 53 of the row 26 is already interposed between two successive strips with pellets 40, and is secured to strips with pellets 40 between which it is interposed.

The row 26 is attached against the inner surface 32 of the wall 24, and is for example glued on this inner surface 32.

The row 26 is in particular attached against the inner surface 32 such that the through passages 70 of the washers 53 are arranged against through holes 38 of the wall 24.

Each lightning trap 36 is inserted in one of the through holes 38 of the wall 24, the lower part 48 of the lightning trap 36 thus being inserted in the through passage 70 of a washer 53.

Each nut 52 is next mounted on a lightning trap 36 to fasten the lightning trap 36 to the wall 24 and to the row 26.

Thus, a same lightning trap 36 fastens two successive strips with pellets 40.

The oblong shape of the through passages 70 greatly facilitates the assembly. It makes it possible to account for the drilling uncertainties inherent to the specific shape of the wall 24.

This embodiment is particularly suitable for the case where the drilling allowances are for example greater than 1 mm.

Furthermore, the contact between the lightning traps 36 and the strips 40 is guaranteed by the presence of the washers 53 secured to the strips 40. The contact is further made identical for all of the traps 36.

Subsequently, the maintenance of the lightning protection system is easier.

Alternatively, only one of the washers 53 of the row 26 has such a through passage 70 and/or such an outer contour 72.

A fifth nose according to an embodiment of the invention will now be described, in reference to FIG. 8.

This fifth nose differs from the fourth nose of FIG. 7 in that, aside from the washer 68 of the last lightning trap 44, each washer 53 has a noncircular outer contour 72.

In the example illustrated in FIG. 8, the outer contour 72 of each of said washers 53 has an oblong shape.

The oblong shape of each of these outer contours 72 is more elongated along the longitudinal axis than perpendicular to this axis.

The noncircular shape of the outer contour 72 of each washer 53 makes it possible to improve the transparency to electromagnetic waves for the antenna 14.

The washer 68 of the rear lightning trap 64 of said row 26 has a circular outer contour.

A sixth nose will now be described, in reference to the exploded view of FIG. 9.

This sixth nose differs from the fifth in that each strip with pellets of the row 26 is secured to two washers 53, each washer 53 respectively being arranged at each end of the strip with pellets 40.

For clarity reasons, the lightning traps 36 are not shown in FIG. 9.

Other than at the first lightning trap 42 and the last lightning trap 44, each washer 53 of one end of a strip with pellets 40 is superimposed on a washer 53 of one end of another successive strip with pellets 40.

Two washers 53 that are superimposed are electrically connected.

In the assembly associated with this sixth nose, illustrated in FIG. 9, during the provision of the row 26, several strips with pellets 40 are provided separated from one another, each strip with pellets 40 already being secured to two washers 53 respectively arranged at each end of the strip with pellets 40.

Each of these strips with pellets is attached against the inner surface 32, while superimposing the washers 53, and is glued to form the row 26.

Each lightning trap 36 is inserted into one of the through holes 38 of the wall 24, and the lower part 48 of the lightning trap 36 is inserted in the through passages 70 of two superimposed washers 53.

Owing to this sixth nose, the maintenance of the lightning protection system is even easier, since after a lightning strike, only the damaged strips 40 need to be changed in a same row 26.

Figure 10:
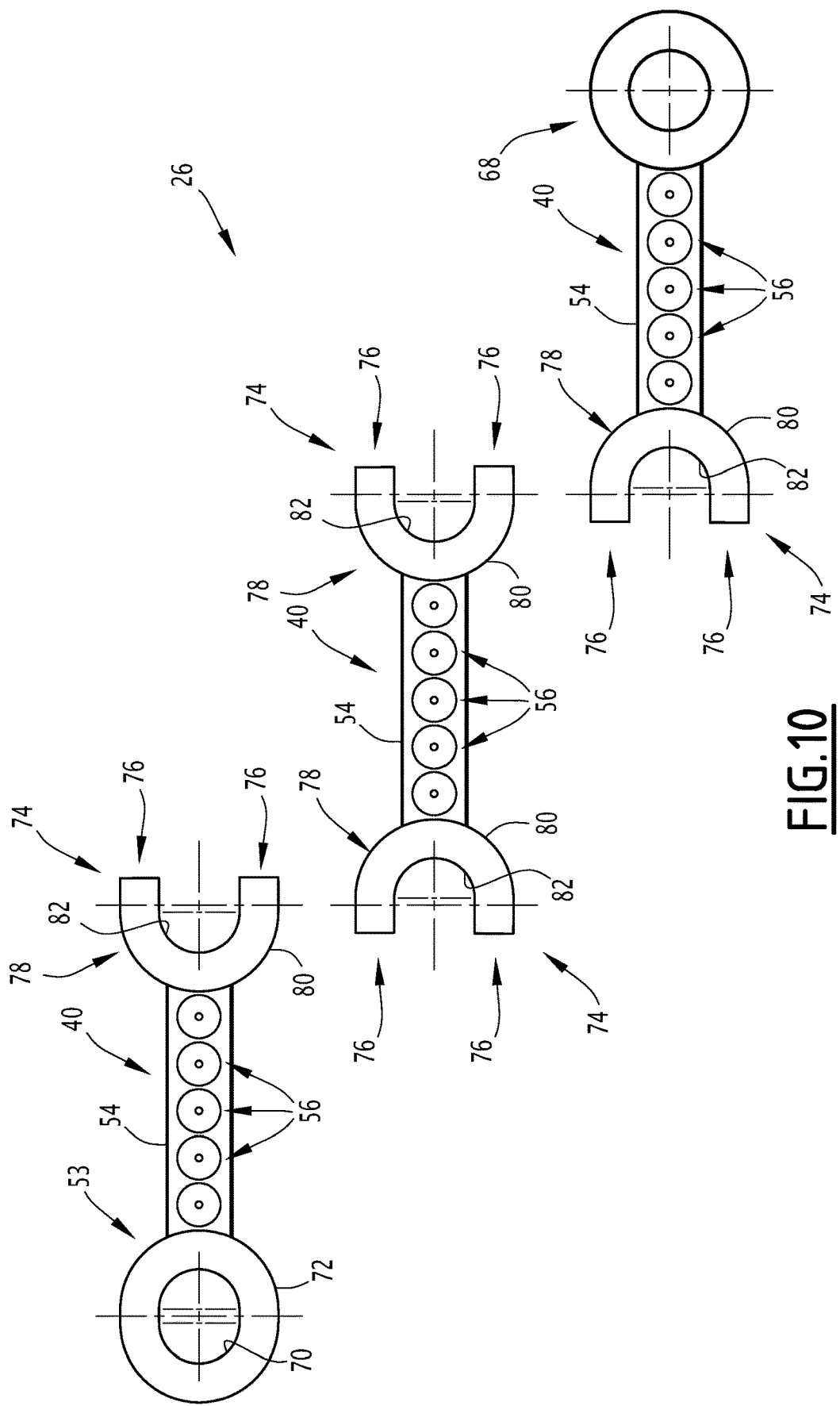
FIG. 10 is an exploded schematic view of a row of pellets of an alternative of the sixth nose.

In an alternative of the sixth nose, illustrated in reference to the exploded view of FIG. 10, each strip with pellets of the row 26 is secured to two washer parts 74 respectively arranged at each end of the strip with pellets 40, aside from the strips with pellets at the first lightning trap 42 and the last lightning trap 44.

For clarity reasons, the lightning traps 36 are not shown in FIG. 10.

Each washer part 74 corresponds to a half-washer 53 as previously described that has been cut, for example perpendicular to the longitudinal axis.

As illustrated in FIG. 10, each washer part 74 is formed by two parallel straight branches 76 connected by a curved branch 78.

The curved branch 78 is in the shape of a half-circle.

The contour 80 of the curved branch 78 located across from the pellets 56 has a radius larger than the radius of the contour 82 of the curved branch 78 located separated from the pellets 56.

Each washer part 74 is thus substantially U-shaped.

Each washer part 74 of a strip with pellets 40 is superimposed, over at least one region, on a washer part 74 of another successive strip with pellets 40. In particular, the straight branches 76 of these two washer parts 74 are superimposed and the two washer parts 74 thus delimit a passage in which the lower part 48 of the lightning trap 36 is received.

The strip with pellets receiving the first lightning trap 42 is secured to a washer 53, as previously described, at its end arranged across from the first lightning trap 42 and a washer part 74 at its other end.

The strip with pellets receiving the last lightning trap 44 is secured to a washer 68 with a circular outer contour at its end arranged across from the last lightning trap 44 and a washer part 74 at its other end.

During the assembly, a lightning trap 36 is inserted into one of the through holes 38 of the wall 24 and through a passage delimited by two superimposed washer parts 74.

Alternatively, the features specific to the third and fourth noses are suitable for the second nose.

A seventh nose according to an embodiment of the invention will now be described, in reference to FIG. 11.

This seventh nose differs from the third nose of FIG. 6 in that at least two strips with pellets 40 of a same row 26 are not aligned.

Figure 11:
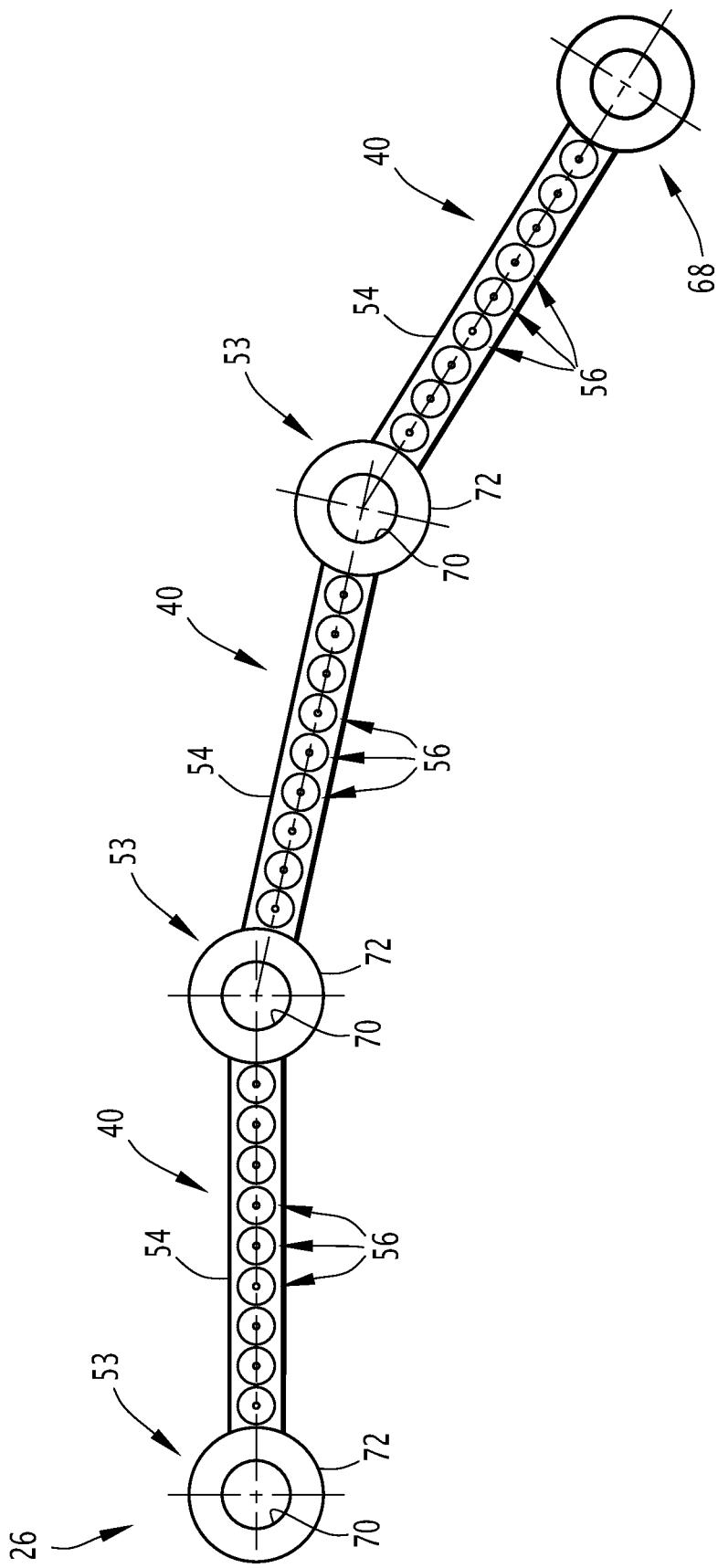
FIGS. 11 to 12 are views similar to FIG. 6 of a row of pellets of a lightning protection system of a seventh and an eighth nose according to an embodiment of the invention.

In the example of FIG. 11, no strip with pellets 40 of the row 26 is aligned with a strip with pellets 40 that follows it.

In particular, each strip with pellets 40 is substantially straight while extending respectively along a longitudinal axis, the longitudinal axes of two successive nonaligned strips 40 forming an angle greater than 5° between them, preferably greater than 10°.

The row 26 is thus not straight.

Arranging the strips with pellets 40 such that they are not aligned makes it possible to arrange them so that the lightning traps 36, and in particular their outer upper parts 46, follow the aerodynamic flow of the air flowing over the outer surfaces 34 of the wall 24. The air resistance is thus further reduced.

Furthermore, this makes the lightning protection system 16 easier to assemble during production.

An eighth nose according to an embodiment of the invention will now be described, in reference to FIG. 12.

This eighth nose differs from the third nose of FIG. 6 in that a row 26 has at least one branch of strips with pellets 40. "Row" thus here refers to a set of strips with pellets 40 electrically connected to one another via washers 53.

Figure 12:
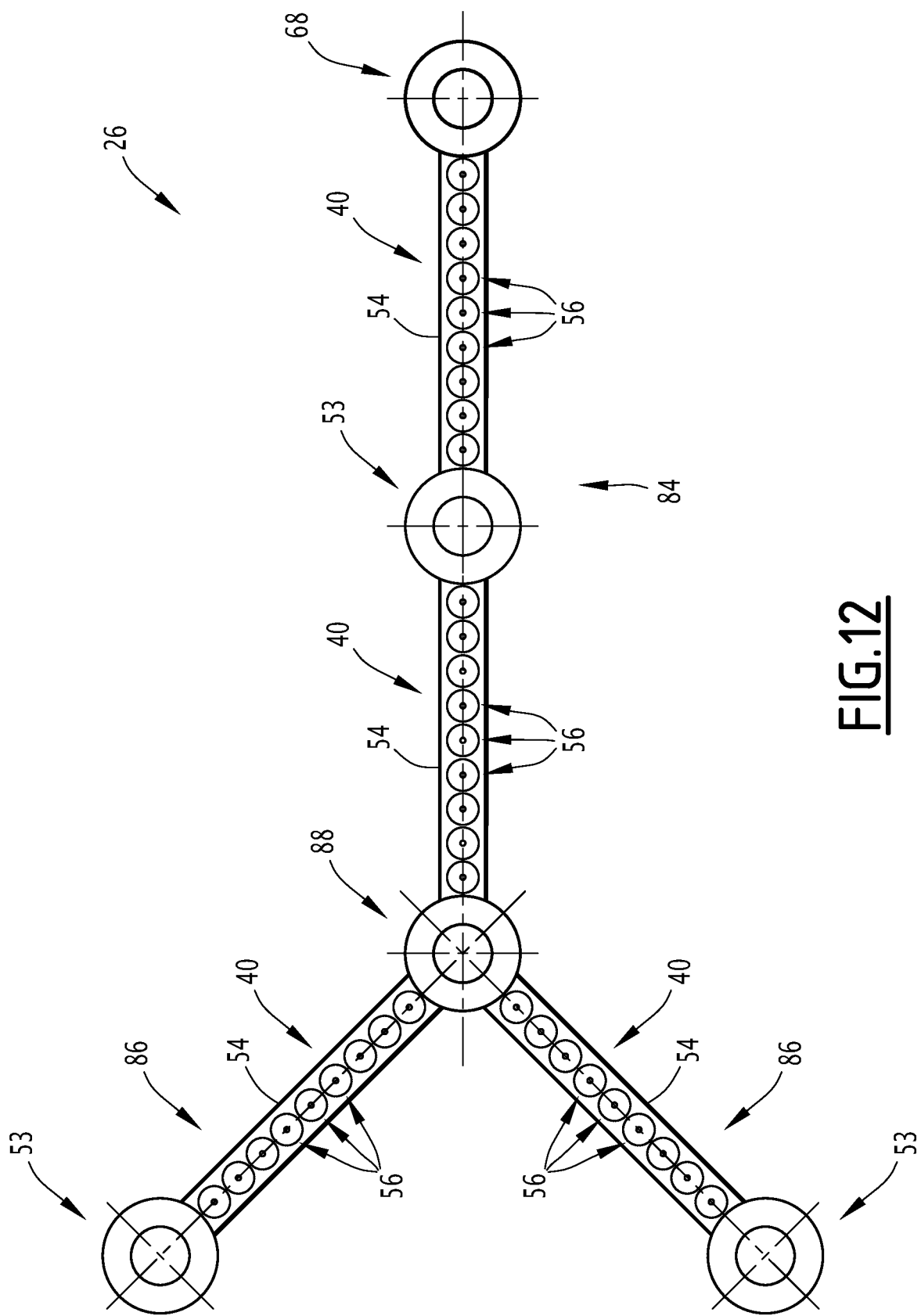

For clarity reasons, only the row 26, without the lightning traps 36, is shown in FIG. 12.

In the example of FIG. 12, the row 26 splits, from a root 84, into a plurality of auxiliary branches 86 of strips with pellets 40. More specifically, the row 26 comprises at least one dividing washer 88 from which the auxiliary branches 86 extend.

In the example of FIG. 12, the root 84 comprises at least two substantially aligned successive strips with pellets 40.

The root 84 comprises the washer 68 of the last lightning trap 44, the washer 68 being grounded by the airplane.

Thus, the root 84 extends between the washer 68 of the last lightning trap 44 and the dividing washer 88.

The auxiliary branches 86 extend from the dividing washer 88 toward the tip of the nose 10. Here, the row 26 splits into two auxiliary branches 86 of strips with pellets 40.

A strip with pellets 40 of each of the auxiliary branches 86 come together at the dividing washer 88, the dividing washer 88 being interposed between these strips 40.

In the example of FIG. 12, the auxiliary branches 86 comprise only one strip with pellets 40. Alternatively, they comprise more than one.

The strips with pellets 40 of the auxiliary branches 86, coming together at the dividing washer 88, form an angle, opposite the main branch 84, greater than 10°.

Preferably, like for the sixth nose, each strip with pellets 40 of the row 26 is secured to two washers 53, each washer 53 respectively being arranged at each end of the strip with pellets 40. The dividing washer 88 is thus formed by a superposition of washers 53.

During operation, when a lightning bolt touches a lightning trap 36 of one of the auxiliary branches 86, the electrical current flows in the row 26 to the dividing washer 88. From the dividing washer 88, the current flows toward the washer 68 from the last lightning trap 44, given that the last lightning trap 44 and the washer 68 are grounded by the airplane.

Such a lightning protection system makes it possible to densify the lightning traps over critical areas of the nose. These critical areas are for example areas including equipment sensitive to lightning and arranged close to the wall 24, the equipment thus being susceptible to catching the lightning when it flows along the wall 24.

Thus, preferably, the dividing washer 68 is located behind the antenna 14. This allows distributing the lightning traps 36 in the critical areas, namely just above the antenna 14, or above antennas in case the system has a plurality of antennas, or above any metal element closed to the wall 24.

Another advantage is that this densification is done while limiting the number of strips 40 and lightning traps 36 that are necessary.

Furthermore, like for the seventh nose, these branches make it possible to position the lightning traps 36, and in particular their outer upper parts 46, so that they follow the aerodynamic flow of the air flowing over the outer surfaces 34 of the wall 24.

Alternatively, the row 26 comprises more than two auxiliary branches 86 extending from the dividing washer 88.

A ninth nose according to an embodiment of the invention will now be described, in reference to FIG. 13.

This ninth nose differs from the eighth nose of FIG. 12 in that the row 26 comprises a plurality of branches of strips with pellets 40.

In particular, the row 26 comprises a plurality of branching washers 88.

Figure 13:
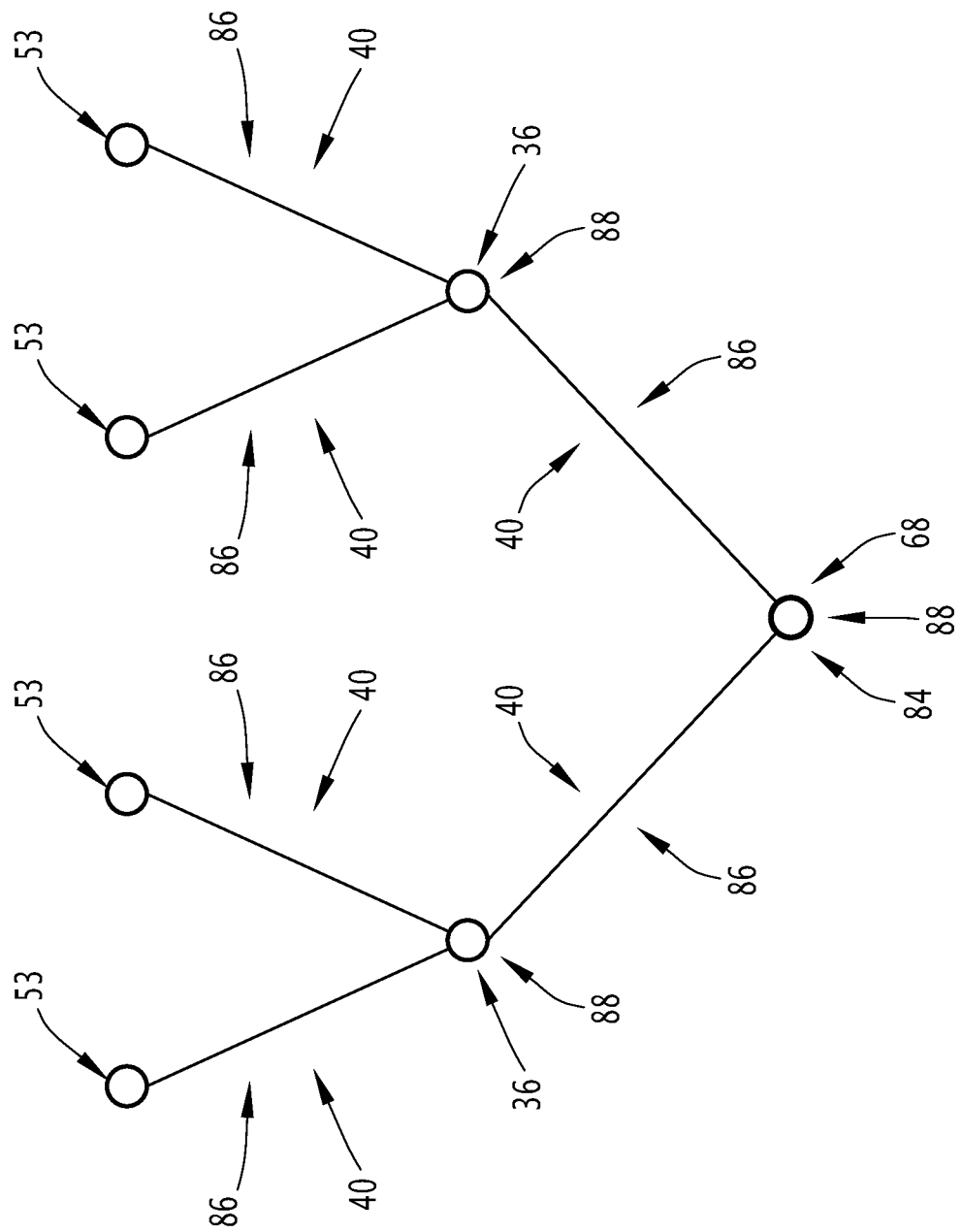
FIG. 13 is a schematic view of a ninth nose according to an embodiment of the invention.

Furthermore, as illustrated in FIG. 13, the root 84 here is formed by the washer 68 receiving the last lightning trap 44, this washer 68 thus being a dividing washer 88.

Each auxiliary branch 86 extending from the washer 68 receiving the last lightning trap 44 forms a root dividing into two other auxiliary branches 86.

Alternatively, the features specific to the eighth and ninth noses are suitable for the other embodiments.

Alternatively, the nose 10 comprises one or several other antennas received in the inner volume 18. Each antenna is configured to emit and/or receive an electromagnetic signal.

Alternatively, a same cover 28 covers some or all of the rows 26 of pellets. In still another alternative, the lightning protection system 16 comprises a plurality of covers 28, each covering at least part of a row 26 of pellets.

In particular, each cover 28 covers at least the lightning traps 46 and the lightning traps 36 arranged at a distance smaller than 5 mm from the antenna 14. This distance is chosen to be as small as possible to minimize the bulk.

Owing to the number and the geometry of the lightning traps 36, the lightning protection system 16 guarantees a systematic attachment of the lightning on the traps 36.

The thickness of the substrate 54, the size of the pellets 56 and the number of rows 26 of pellets guarantee the robustness of the strips with pellets 40.

A lightning strike on the nose 10 does not produce significant damage to the latter and the lightning protection system 16. This prevents metal parts from being ejected from the lightning traps 36, which could threaten other elements of the nose 10 or be ingested by the engines placed at the rear.

The bulk of the strips with pellets 40 is reduced compared with a lightning protection system 16 comprising metal strips, in particular because the strips 40 are glued to the inner surface 32.

The smaller section of the lightning traps 36 and the size of the pellets 56 do not disturb the radiating performance of the antenna 14. The lightning protection system 16 guarantees good transparency to electromagnetic waves for the antenna 14.

The placement of the conductive metal foil 60 behind the antenna 14 easily guides an electrical current while not decreasing the transparency of the lightning protection system 16 to the electromagnetic waves for the antenna 14.

The metal foil 60 also reduces the release threshold of the strip with pellets 40, the breakdown voltage being proportional to the number of air gaps between the pellets 56 up to the rear lightning traps 64.

Furthermore, given that the strips with pellets 40 are positioned on the inner surface 32 of the wall 24, the lightning protection system 16 does not disrupt the flow of the mass of air 20 on the wall 24 and therefore reduces the aerodynamic drag of the nose 10 and therefore the consumption of the aircraft.

Furthermore, when the cover 28 is open-worked, an operator is easily able to inspect the state of the strips with pellets 40, in particular after having observed the lightning strike of one of the lightning traps.

Lastly, given that the strips with pellets 40 cannot be painted, their arrangement on the inner surface 32 of the wall 24 allows the entire outer surface 34 and lightning traps 36 to be painted. This improves the aesthetics of the nose 10.

It all of the previous embodiment, the antenna and the lightning protection system or comprised in an aircraft nose that forms an aircraft part.

Alternatively, the aircraft part is a ventral part 90 of a fuselage of the aircraft.

Figure 14:
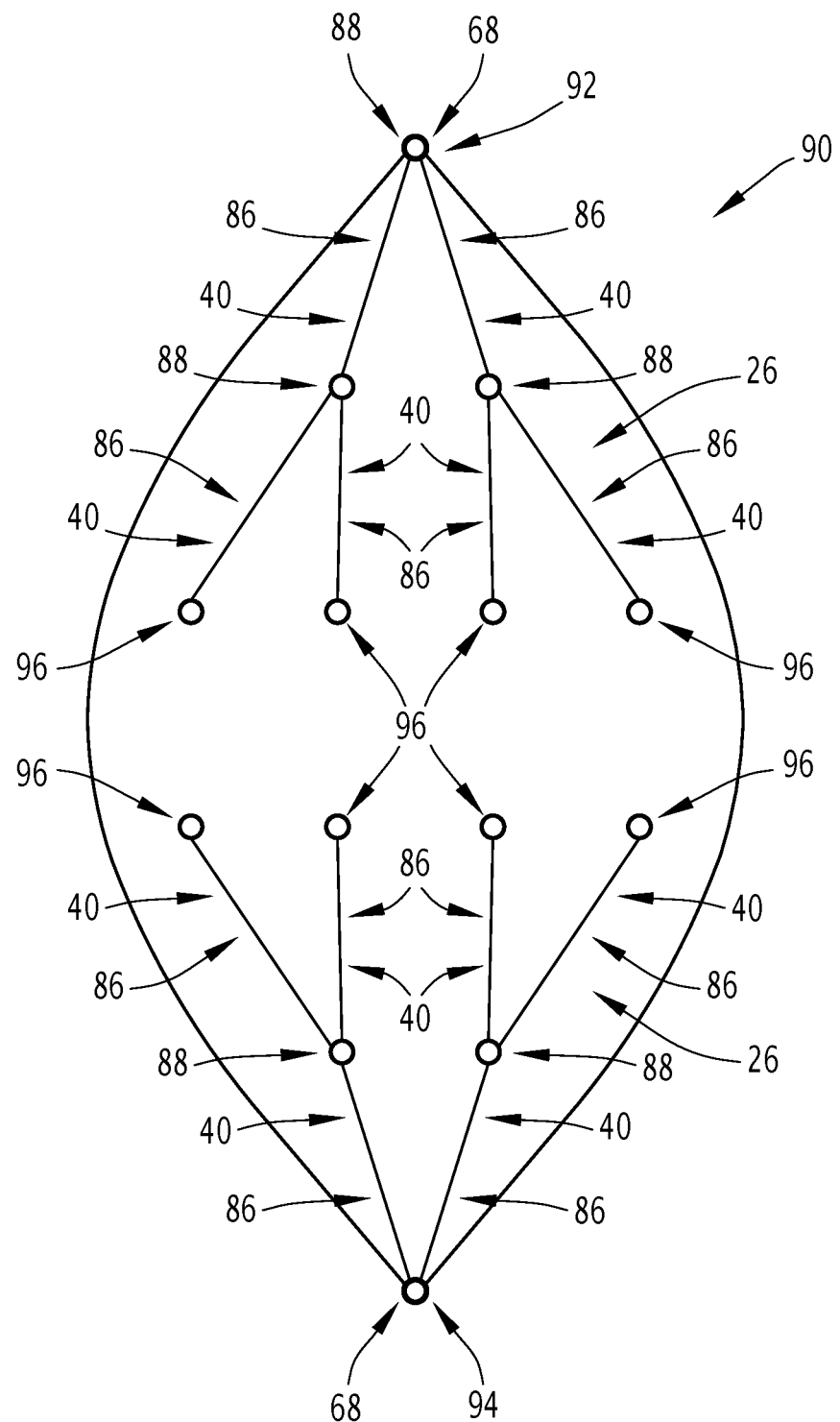
FIG. 14 is a schematic bottom view of a ventral part of an aircraft fuselage according to an embodiment of the invention.

Such an alternative is for example illustrated in FIG. 14.

The ventral part 90 is substantially bathtub-shaped with a first tip 92 and a second tip 94.

In the embodiment illustrated in FIG. 14, the ventral part 90 comprises a lightning protection system that has features similar to the lightning protection system of the ninth nose described above.

In particular, this lightning protection system comprises two rows 26 of strips with pellets 40 having branches.

For each of these two rows 26, the washer 68 of the last lightning trap 44 is arranged at one of the tips 92, 94 of the ventral part 90.

The two rows 26 extend toward one another.

They are not connected to one another.

In particular, the final ends 96 of the auxiliary branches 86 of one row 26 are arranged across and at a distance from the final ends 96 of the auxiliary branches 86 of the other row 26.

These final ends 96 are formed by washers 53, as previously described.

The antenna of the ventral part 90 is preferably arranged at the final ends 96 of the rows 26.

In still another alternative, not illustrated, of the previous embodiments, the aircraft part is part of a vertical stabilizer of the aircraft, or any other part of the aircraft.

In all the above mentioned embodiments, each strip with pellets 40 and, if any, each conductive metal foil 60 are attached on the inner surface 32 of the wall 24. Alternatively, at least one a row 26 comprises a strip with pellets 40 and/or a conductive metal foil 60 attached on the outer surface 34 of the wall 24. Such a lightning protection system 16 can then be adapted to any required configuration.

What is claimed is:

1. A lightning protection system of an aircraft comprising:
   a wall defining an inner surface and an outer surface, the outer surface being configured to come into contact with a mass of air located around the aircraft;
   at least two lighting traps received in holes traversing the wall, the at least two lightning traps being electrically conductive; and
   at least one strip with pellets having an electrically insulating substrate and electrically conductive pellets spaced apart from one another on the electrically insulating substrate, the strip with pellets being fastened on the wall by the at least two lightning traps, the strip with pellets being attached on the inner surface of the wall, and being in contact with the inner surface of the wall.

2. The lightning protection system according to claim 1, wherein the electrically insulating substrate of the strip with pellets is a strip having a width smaller than 20 mm.

3. The lightning protection system according to claim 1, wherein the electrically conductive pellets are spaced apart from one another by an air gap smaller than 0.1 mm.

4. The lightning protection system according to claim 1, wherein the substrate has a thickness comprised between 0.1 mm and 0.5 mm.

5. The lightning protection system according to claim 1, wherein each of the at least two lightning traps has a frustoconical upper part flaring toward the outer surface, a section of the frustoconical upper part at the outer surface being comprised between 100 $mm^2$ and 300 $mm^2$.

6. The lightning protection system according to claim 1, further comprising a cover covering the at least two lightning traps and the strip with pellets, the cover being electrically insulating.

7. The lightning protection system according to claim 6, wherein the cover has a thickness comprised between 1 mm and 5 mm.

8. The lightning protection system according to claim 6, wherein the cover, the strip with pellets and the inner surface delimit an inner space filled with an electrically insulating fluid.

9. The lightning protection system according to claim 6, wherein the cover is fastened by lateral edges of the cover to lateral edges of the strip with pellets, the cover being arranged separated from the strip with pellets, the lightning traps and the electrically conductive pellets.

10. The lightning protection system according to claim 1, wherein the strip with pellets is fastened by at least one additional lightning trap such that the strip with pellets is fastened by at least three lightning traps, the at least three lightning traps being separated from each other by a distance greater than 100 mm.

11. The lightning protection system according to claim 1, further comprising at least a nut and at least one washer part arranged at an end of a strip with pellets, one of the at least two lightning traps being mounted in the washer part and cooperating with the nut and the washer part to attach the strip of pellets to the inner surface of the wall, the washer part being arranged between the nut and the strip of pellets.

12. The lightning protection system according to claim 1, wherein the at least one strip with pellets is a plurality of strips with pellets forming a row of pellets, each of the strips with pellets of the row of pellets being substantially straight while extending respectively along a longitudinal axis,
    the system further comprising at least a nut and at least one washer receiving one of the at least two lightning traps, said lightning trap cooperating with the nut and the washer to attach the strip of pellets to the inner surface of the wall, the washer being arranged between the nut and the strip of pellets,
    the at least one washer having a through passage receiving the one lightning trap, the through passage having an oblong inner contour, the oblong inner contour being more elongated along the longitudinal axis of one of the strips of pellets than perpendicular to said longitudinal axis.

13. The lightning protection system according to claim 1, wherein the at least one strip of pellets is a plurality of strips of pellets forming a row of pellets, the row of pellets comprising the plurality of strips with pellets, each of the strips with pellets of the row of pellets being substantially straight while extending respectively along a longitudinal axis, the longitudinal axes of at least two successive strips of the strips with pellets of the row of pellets forming an angle between them greater than 5°.

14. The lightning protection system according to claim 1, wherein the at least one strip of pellets is a plurality of strips of pellets and the electrically conductive pellets form a row of pellets, the row of pellets being divided, from a root, into a plurality of auxiliary branches of the strips with pellets.

15. An aircraft part comprising:
    an antenna configured to emit and/or receive an electromagnetic signal; and
    the lightning protection system according to claim 1, the wall of the lightning protection system surrounding the antenna.

16. The aircraft part according to claim 15, wherein the lightning protection system comprises an electrically conductive metal foil fastened on the inner surface of the wall, the lightning protection system including an intermediate lightning trap fastening both the conductive metal foil and the at least one strip with pellets on the inner surface of the wall, the conductive metal foil being located behind the antenna.

17. The aircraft part according to claim 16, wherein the aircraft part defines an inner volume, the antenna delimiting a radiation zone in the inner volume configured to be traversed by an electromagnetic signal received or emitted by the antenna, the intermediate lightning trap being arranged outside the radiation zone.

18. The aircraft part according to claim 15, wherein the antenna has a minimal operating wavelength associated with a maximal operating frequency, wherein at least one of:
    each of the electrically conductive pellets having a maximal cross-section having a larger dimension smaller than the minimal operating wavelength, and/or each of the at least two lightning traps having a maximal cross-section having a larger dimension smaller than the minimal operating wavelength.

19. The aircraft part according to claim 15, wherein the aircraft part is chosen from among: an aircraft nose, a ventral part of a fuselage of the aircraft or a part of a vertical stabilizer of the aircraft.

20. A method for mounting a lightning protection system, comprising the following steps:
   providing a wall defining an inner surface and an outer surface, the outer surface being configured to come into contact with a mass of air located around an aircraft; and
   mounting at least two lightning traps in holes traversing the wall, the at least two lightning traps being electrically conductive, and fastening by the at least two lightening traps of at least one strip of pellets spaced apart from one another on a substrate, the strip with pellets being fastened on the inner surface of the wall, such that the strip with pellets is in contact with the inner surface of the wall.

21. The mounting method according to claim 20 further comprising arranging at least one washer part at the end of a strip with pellets, one of the at least two lightning traps being mounted in the at least one washer part and cooperating with the nut and the washer part to attach the strip of pellets to the inner surface of the wall, the washer part being arranged between the nut and the strip of pellets.

\* \* \* \* \*